Patented Apr. 18, 1939

2,155,107

UNITED STATES PATENT OFFICE 2,155,107

PROCESS FOR THE MANUFACTURE OF ROCK WOOL

Waldo E. Tyler, Kansas City, Mo., and Paul R. Chamberlain and Russ A. Loveland, Dewey, Okla., assignors to Dewey Portland Cement Company, Kansas City, Mo., a corporation of West Virginia No Drawing. Application November 25, 1936, Serial No. 112,660

3 Claims. (Cl. 106—36.3)

This invention relates to a process for the manufacture of rock wool.

Rock wool has heretofore been manufactured from rock or other mineral material in its natural form by fusing the mineral material and subjecting a stream of the molten material to a high velocity jet of steam to convert the material into fibrous or shredded form. The conversion of the rock into a molten slag is generally carried out in a cupola by the use of coke as a fuel.

We have now found that a very satisfactory rock wool can be economically produced from Portland cement clinkers and a siliceous rock or mineral, such as sandstone. Since the Portland cement clinkers can be made in the usual way using a low grade fuel, such as pulverized coal, it is possible to effect a very considerable saving in the cost of the fuel owing to the fact that the high grade coke needed for the operation of the cupola is about four or five times the cost of pulverized coal. Furthermore, by using Portland cement clinkers above a certain size and substantially free from fines, the operation of the cupola can be carried out much more efficiently because of the fact that the air used in effecting combustion of the fuel can be more uniformly distributed throughout the cupola charge.

It is therefore an important object of this invention to provide a method for the manufacture of rock wool using Portland cement clinkers as a starting material, whereby a considerable saving in the cost of fuel can be realized.

It is a further important object of this invention to provide a method for the manufacture of rock wool from Portland cement clinkers and siliceous acidic rocks or minerals, thereby enabling the composition of the rock wool to be closely controlled and a very satisfactory product produced.

It is a further important object of this invention to provide a rock wool made from Portland cement clinkers and siliceous acidic rocks or minerals, the product having a uniform composition.

Other and further important objects of this invention will be apparent from the disclosures in the specification.

In accordance with the principles of this invention, the charge comprises Portland cement clinkers and a siliceous acidic rock or mineral, such as sandstone. The Portland cement clinkers are prepared in the usual manner by burning limestone or other argillaceous material, clay, and the like, in a rotary kiln, using pulverized coal as the fuel. It is not practical, however, in the making of the Portland cement clinkers, to add sufficient acidic rock or mineral to the charge in the rotary kiln to produce a clinker having the desired composition of the final rock wool. The clinkers as they are discharged from the rotary kiln are preferably graded and only clinkers larger than about ¾ of an inch in their greatest dimension are separated out for use in the manufacture of rock wool.

The charge going into the cupola is made up of Portland cement clinkers and a siliceous acidic rock or mineral, such as sandstone, together with the required amount of a high grade coke as a fuel. Typical analyses of the clinker and sandstone are as follows:

| | Clinkers Percent | Rock Percent |
|---|---|---|
| $SiO_2$ | 21.5 | 89.8 |
| $Al_2O_3$ | 7.1 | 4.8 |
| $Fe_2O_3$ | 3.6 | 2.9 |
| $CaO$ | 66.5 | 0.4 |
| $MgO$ | 1.4 | 0.3 |

The proportions of clinker to sandstone may be varied quite widely, say from 10 parts of clinker and 4 parts of sandstone to 10 parts of clinker and 30 parts of sandstone, depending upon the character of the wool desired and the temperature of the melt. However, in order to realize the greatest economy and obtain the finest grade of rock wool, it is preferable to vary the mixture within a narrow range only, nearer to the proportion of 10 parts of clinker and 4 parts of sandstone. A very satisfactory rock wool produced in accordance with our method has the following analysis:

| | Percent |
|---|---|
| $SiO_2$ | 45 |
| $CaO$ | 44 |
| $Al_2O_3$ | 6 |
| $Fe_2O_3$ | 4 |
| $MgO$ | 1 |

Since the clinker composition can be very carefully controlled and since the acidic rock or minerals available are of comparatively uniform composition, an accurate control over the process of our invention can readily be maintained. As a result, our product is of a consistently uniform composition. In particular, our rock wool is substantially free from any free lime in solid solution, the presence of which in rock wool made by other processes has been found to cause shrinkage of the wool in place and decomposition of the fiber.

A further advantage, as already pointed out, resides in the fact that a considerable saving in fuel cost can be effected through the use of cheaper fuel in the manufacture of the Portland cement clinkers than is possible in the operation of the cupola. About 50% of the more expensive coke that would be required in the usual cupola operation is replaced, in our process, by the less expensive coal used in the rotary kiln.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a method of making rock wool, the step which comprises forming a charge of a mixture of between 10 parts of Portland cement clinkers and 4 parts of siliceous acidic rock material and 10 parts of said clinkers and 30 parts of said rock material by weight, said clinkers and rock having approximately the following composition:

|  | Clinkers Percent | Rock Percent |
|---|---|---|
| $SiO_2$ | 21.5 | 89.8 |
| $Al_2O_3$ | 7.1 | 4.8 |
| $Fe_2O_3$ | 3.6 | 2.9 |
| CaO | 66.5 | 0.4 |
| MgO | 1.4 | 0.3 |

2. In a method of making rock wool, the step which comprises forming a charge of Portland cement clinkers and siliceous acidic material so proportioned as to give a rock wool of substantially the following analysis:

|  | Percent |
|---|---|
| $SiO_2$ | 45 |
| CaO | 44 |
| $Al_2O_3$ | 6 |
| $Fe_2O_3$ | 4 |
| MgO | 1 |

3. In a method of making rock wool, the step which comprises forming a charge of a mixture of about ten parts of Portland cement clinkers and four parts of siliceous acid rock material by weight, said clinkers and rock having approximately the following composition:

|  | Clinkers Percent | Rock Percent |
|---|---|---|
| $SiO_2$ | 21.5 | 89.8 |
| $Al_2O_3$ | 7.1 | 4.8 |
| $Fe_2O_3$ | 3.6 | 2.9 |
| CaO | 66.5 | 0.4 |
| MgO | 1.4 | 0.3 |

WALDO E. TYLER.
PAUL R. CHAMBERLAIN.
RUSS A. LOVELAND.